US007616129B2

(12) United States Patent
Thacher

(10) Patent No.: US 7,616,129 B2
(45) Date of Patent: Nov. 10, 2009

(54) IN-VEHICLE CONDITIONAL MULTI-MEDIA CENTER

(75) Inventor: Jeffery W. Thacher, Roswell, GA (US)

(73) Assignee: Discrete Wireless, Inc., Atlanta, GA (US)

( * ) Notice: Subject to any disclaimer, the term of this patent is extended or adjusted under 35 U.S.C. 154(b) by 150 days.

(21) Appl. No.: 11/308,367

(22) Filed: Mar. 19, 2006

(65) Prior Publication Data

US 2007/0126604 A1 Jun. 7, 2007

Related U.S. Application Data

(63) Continuation-in-part of application No. 11/164,679, filed on Dec. 1, 2005.

(51) Int. Cl.
*G08G 1/09* (2006.01)
(52) U.S. Cl. .................... 340/905; 345/8; 701/200; 701/202; 701/207
(58) Field of Classification Search ............ 340/905, 340/691.6; 345/8; 701/200, 201, 202, 207, 701/209, 211, 213
See application file for complete search history.

(56) References Cited

U.S. PATENT DOCUMENTS

| 6,216,086 | B1 * | 4/2001 | Seymour et al. ............ 701/202 |
| 6,243,819 | B1 * | 6/2001 | Jung ......................... 713/320 |
| 6,538,623 | B1 * | 3/2003 | Parnian et al. ................. 345/8 |
| 6,707,421 | B1 * | 3/2004 | Drury et al. .............. 342/357.1 |
| 6,812,942 | B2 * | 11/2004 | Ribak .......................... 345/30 |
| 6,990,407 | B1 * | 1/2006 | Mbekeani et al. ........... 701/117 |
| 7,139,659 | B2 * | 11/2006 | Mbekeani et al. ........... 701/117 |
| 2004/0181337 | A1 * | 9/2004 | Kawasaki et al. ........... 701/209 |
| 2006/0095195 | A1 * | 5/2006 | Nishimura et al. ........... 701/96 |

* cited by examiner

*Primary Examiner*—Daryl Pope
(74) *Attorney, Agent, or Firm*—Smith Frohwein Tempel Greenlee; Gregory Scott Smith

(57) ABSTRACT

A system for controlling the operation of an in-vehicle multi-media system based on identifying operating conditions for the vehicle. Various operational rules can be applied to the multi-media system based on an identified operating condition. Operating conditions can include a variety of criteria including traffic, weather, vehicle operating parameters, or the like. Once a condition is identified, an operating rule corresponding to that condition can be imposed on the operation of the multi-media system.

19 Claims, 7 Drawing Sheets

|  | Condition A | Condition B | Condition C | Condition D | Condition E | Condition F | Condition G | Condition H | Condition I | Condition J | Condition K | Condition L | Condition M | Condition N | Condition O |
|---|---|---|---|---|---|---|---|---|---|---|---|---|---|---|---|
| Front Video | X | X | X | X | | | | | | | | | | | |
| Rear Video | X | | | | | | | | | | | | | | |
| Email | X | | X | | X | | | | | | | | | | |
| Voice Call | X | | X | | | X | | | | | | | | | |
| Traffic | X | | | | | | X | | | | | | | | |
| Weather | X | | | | | | | X | | | | | | | |
| Games | X | X | X | | | | | | X | | | | | | |
| Internet | X | X | X | | | | | | | X | | | | | |
| Music | X | X | X | | | | | | | | X | | | | |
| Voice Mail | X | | X | | | | | | | | | X | | | |
| Calendar | X | X | X | | | | | | | | | | X | | |
| Addresses | X | X | X | | | | | | | | | | | X | |

Fig. 7

IN-VEHICLE CONDITIONAL MULTI-MEDIA CENTER

CROSS-REFERENCE TO RELATED APPLICATIONS

The present invention is a continuation-in-part of United States Application for Patent filed on Dec. 1, 2005 with a title of "GEO-FENCE LOCATION-SPECIFIC EQUIPMENT STATUS BASED TRIGGER DIRECTED CONTENT DELIVERY" and assigned Ser. No. 11/164,679.

This application is related to the following United States Patent Applications which were filed concurrently herewith and are incorporated herein by reference in their entirety:

Ser. No. 11/308,364 filed on Mar. 19, 2006 with a title of MAPS, ROUTES AND SCHEDULE GENERATION BASED ON HISTORICAL AND REAL-TIME DATA, and Ser. No. 11/308,365 filed on Mar. 19, 2006 with a title of AUTONOMOUS AND DEPENDENT DATA COLLECTION FOR TRAFFIC ANALYSIS.

BACKGROUND OF THE INVENTION

This invention relates to the field of safety related to in-vehicle multi-media systems and, more particularly to imposing condition based rules on the operation of in-vehicle multi-media systems to improve the safety associated with their operation. Furthermore, the present invention is related to the field of distributed geocentric location based systems and their application to the collection of traffic related information and, more particularly to utilizing such information to identify condition based rules to be applied in the use of in-vehicle multi-media systems.

Every now and then, while visiting a remote flea-market, if you look hard enough you will see one—the infamous 8-track tape or maybe even an 8-track tape player. There was a time when the continuous loop of magnetic tape that would cycle through an entire album was state of the art. What's an album you ask? Well, that's the point precisely. Audio, video and other entertainment technology has experienced explosive growth over the last four decades. The advancements such technology has in turn been crammed into cigar-box sized components and packed into vehicle dashboards, consoles, or mounted on the ceilings.

Today it is not uncommon for a family vehicle to be equipped with multiple video screens, a DVD player, wireless headphones, a GPS navigational system, built-in cellular communications, satellite TV and radio, and broadband type data services available through digital cellular technology. The explosive growth caught everyone by surprise, especially the safety regulators. All of the sudden, our roadways are packed with people doing the speed-limit plus 10 MPH while Finding Nemo is blasting through surround sound speakers, the GPS lady is telling the driver that a turn is approaching, a new email arrives and the cellular telephone begins ringing as the result of an inquisitive party wanting to know when you will arrive.

Consumer demand and marketing energy will never allow a retraction of the integration of complex media into the vehicle environment. However, what can demand equal footing is the incorporation of safety measures. Thus, there is a need in the art for safety measures that can be incorporated into a vehicle and integrated with the array of multi-media equipment. As with many safety measures, there are those that will attempt to thwart them. Thus, there is a need in the art for a system and method to employ safety measures on the use and operation of multi-media equipment within a vehicle that can not be easily disabled and, that is flexible enough so that users will not be desirous of disabling the safety measures. In addition, a problem with global safety measures is that not everyone is equally situated. The person driving through the Arizona desert has a completely different set of dynamics than the person driving through Los Angeles during rush hour. Likewise, a business man waiting for a critical email or voice call has different dynamics than a teenager that is cruising around town. In addition, as an individual is driving around town or simply commuting, the dynamics can drastically change as the driver moves between freely flowing traffic to stop-and-go traffic jams. Thus, there is a need in the art for a system and method for providing safety measures for in-vehicle multi-media systems that can be dynamically adapted based on various circumstances and parameters.

BRIEF SUMMARY OF THE INVENTION

The present invention addresses the above-identified needs in the art, as well as other needs in the art through providing a system and method for imposing safety constraints on the operation of a multi-media system operating within a vehicle. Various sensor inputs are utilized to quantify a current operating condition of the vehicle. The current operating condition identifies various circumstances, characteristics and the environment in which the vehicle is being operated. For instance, the conditions can identify various items, such as but not limited to, operating the vehicle in heavy traffic, inclement weather, within a city requiring substantial turns and stops, on a highway at high speeds, a level of importance to be attributed to certain kinds of media content, or the like.

The current operating condition is used to identify a presentation or operational rule to be applied in the operation of the multi-media equipment. In one embodiment, a single rule can be applied to all conditions or, multiple rules may be selected based on the various conditions. The rules may be hard coded into the system or may be user defined and/or selected. The rules are used to identify what operations are available while the identified condition is in existence, as well as priorities to be assigned to the particular functions of the multi-media system. In addition, the general characteristics of operating the system may also be considered in selecting a rule. For instance, a different set of rules may apply to components of the system that deliver content to front seat displays versus rear seat displays.

The sensors employed to identify the current condition can include a variety of types. For instance, the sensors may include measuring equipment that is directly connected to actuators within the vehicle and that are used to determine operating characteristics of the vehicle (i.e., blinker is on, brake pedal is depressed, etc.). In addition, the sensors may include user input information, information retrieved from a traffic analysis system, information downloaded from the Internet such as weather information, or the like.

These and other aspects, embodiments and features of the present invention are more fully described in the following description, figures and claims.

BRIEF DESCRIPTION OF THE SEVERAL VIEWS OF THE DRAWING

FIG. 7 is a matrix that could be used to correlate current conditions with operating rules in an exemplary embodiment of the present invention.

DETAILED DESCRIPTION OF THE INVENTION

The present invention, among other things, operates to impose safety measures on the operation of in-vehicle multi-media equipment. The present invention can operate to control any types of audio and/or video equipment. In one embodiment of the present invention, the various operations and capabilities of the multi-media system are restricted based on the inputs of various sensors, such as vehicle speed, vehicle location, time of day, etc. In another embodiment, the various multi-media capabilities are restricted based on a set of rules, or a driver punch list that identifies operations available under particular conditions. In yet another embodiment, priorities are assigned to the various multi-media functions and the active multi-media function is dependent upon the established priorities. In another embodiment, the operational characteristics of the multi-media system determine the available multi-media functions. Advantageously, the various embodiments of the present invention and combinations thereof operate to allow for a safer driving environment. By employing the various aspects of the present invention, features of the multi-media system that would be distracting to a driver are disabled during high-stress or complicated driving conditions. However, during low stress conditions, such as when parked or sitting at a traffic light, additional features can be made available.

Turning now to the figures, in which like references identify like elements throughout the several views, embodiments, aspects and features of the present invention are described more fully.

Figure 1:
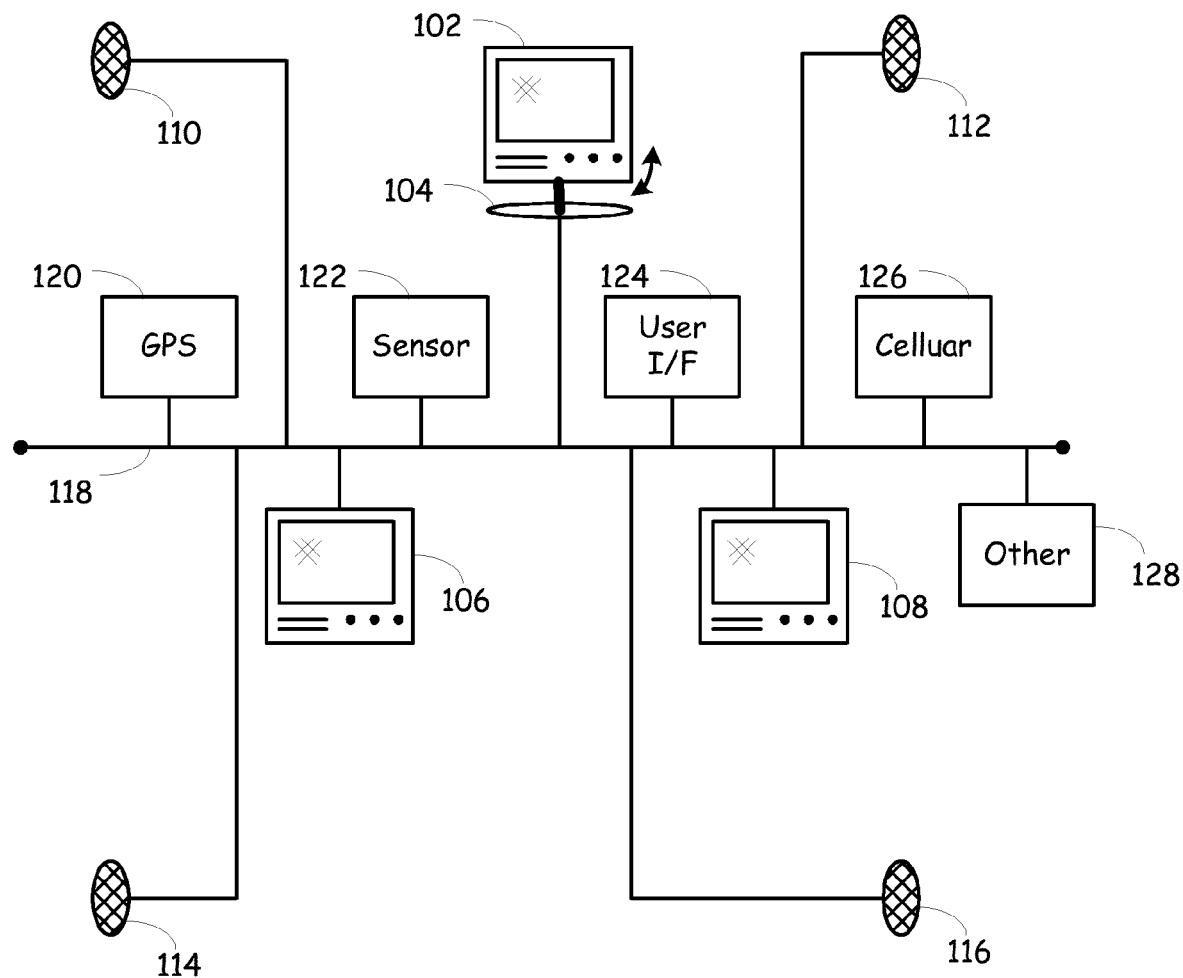
FIG. 1 is an exemplary in-vehicle multi-media entertainment system.

FIG. 1 is an exemplary in-vehicle multi-media entertainment system. Although the illustration depicts several components, it should be understood that the illustrated entertainment system is simply presented as a non-limiting example of a typical system and that the present invention can actually be incorporated into a variety of such environments. In fact, the present invention can be utilized in conjunction with a single device, such as a cellular telephone, a radio, a GPS navigational system, etc., or the present invention can be incorporated into a complex system as illustrated in FIG. 1. In the illustrated environment, several graphical display units are depicted, including a front graphical display unit 102 on a swivel mount 104, a rear left graphical display unit 106 and rear right graphical display unit 108. For instance, the rear left graphical display 106 and rear right graphical display could be mounted in the back of the driver and front passenger seats respectively. In addition, speakers 110, 112, 114 and 116 provide audio for the front left, front right, rear left and rear right. A bus 118, or other communications medium or combination of one or more communications mediums, is used to interconnect the various components of the multi-media system. Other components may include a GPS receiver and processing unit 120, a sensor 122 for measuring various automotive parameters and environmental parameters, a user interface 124 for receiving various inputs and configuration information from a user, cellular based equipment 126 and mobile GPS/location traffic analysis equipment 128. A configuration such as that depicted in FIG. 1, enables a variety of multi-media content to be provided or rendered in various manners, on various displays and either independently or in tandem.

Figure 2:
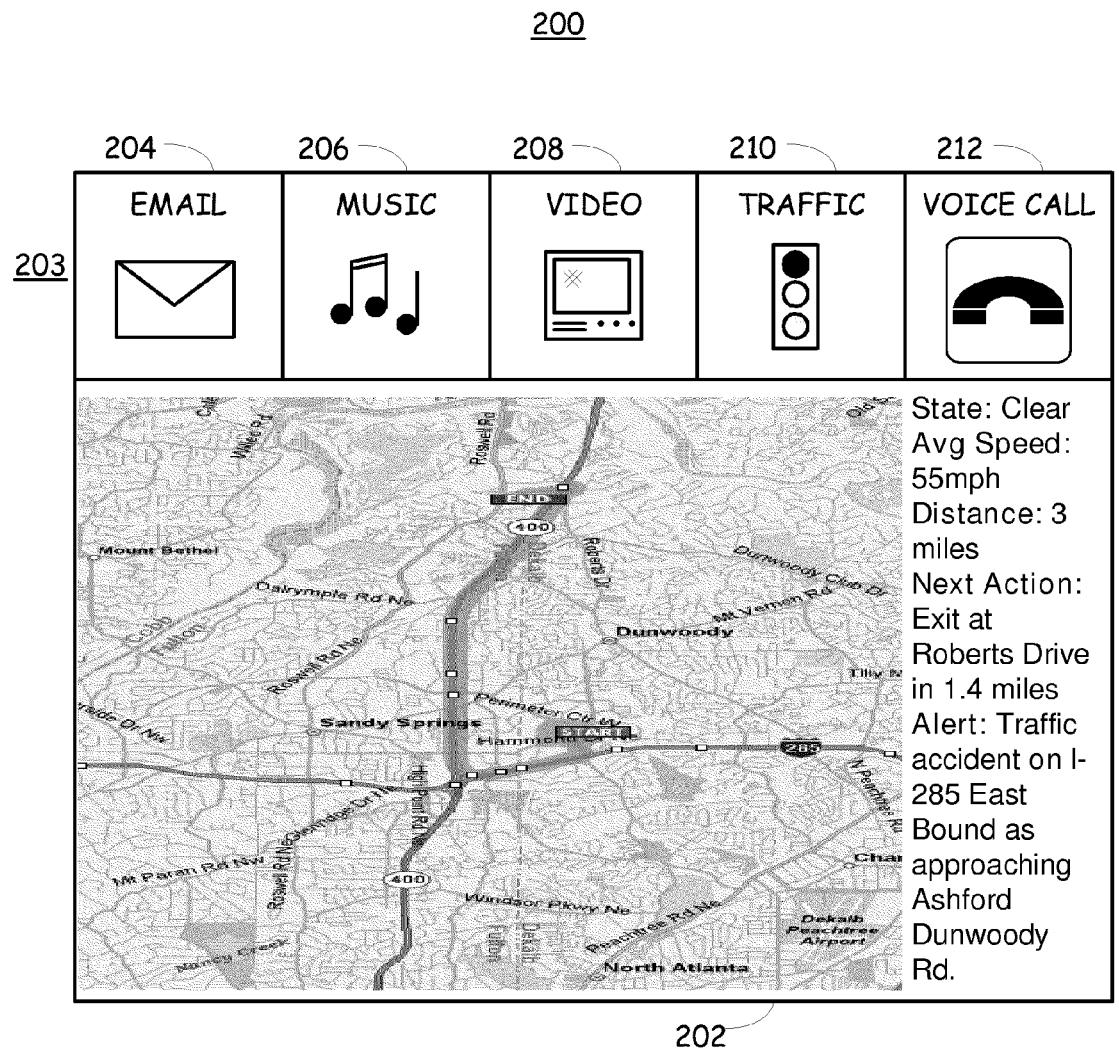
FIG. 2 is an exemplary layout for a display area that could be presented on one of the graphical displays depicted in FIG. 1.

FIG. 2 is an exemplary layout for a display area that could be presented on one of the graphical displays depicted in FIG. 1. The display includes a main active area 202 which is shown as actively displaying a mapping function. In addition, the display includes an inactive area 203 that displays tabs or icons of various functions available and/or supported by the multi-media system. In the exemplary display, the inactive area 203 includes the following functions: email 204, music 206, video 208, traffic 210, and voice call 212. In a fully-available system, each of the functions or capabilities of the multi-media entertainment system are available for user access. For instance, in an embodiment utilizing a touch-sensitive screen, a user can activate any of the functions simply by touching the tab on the screen. In other embodiments, a remote control or other actuation device can be used.

Figure 3:
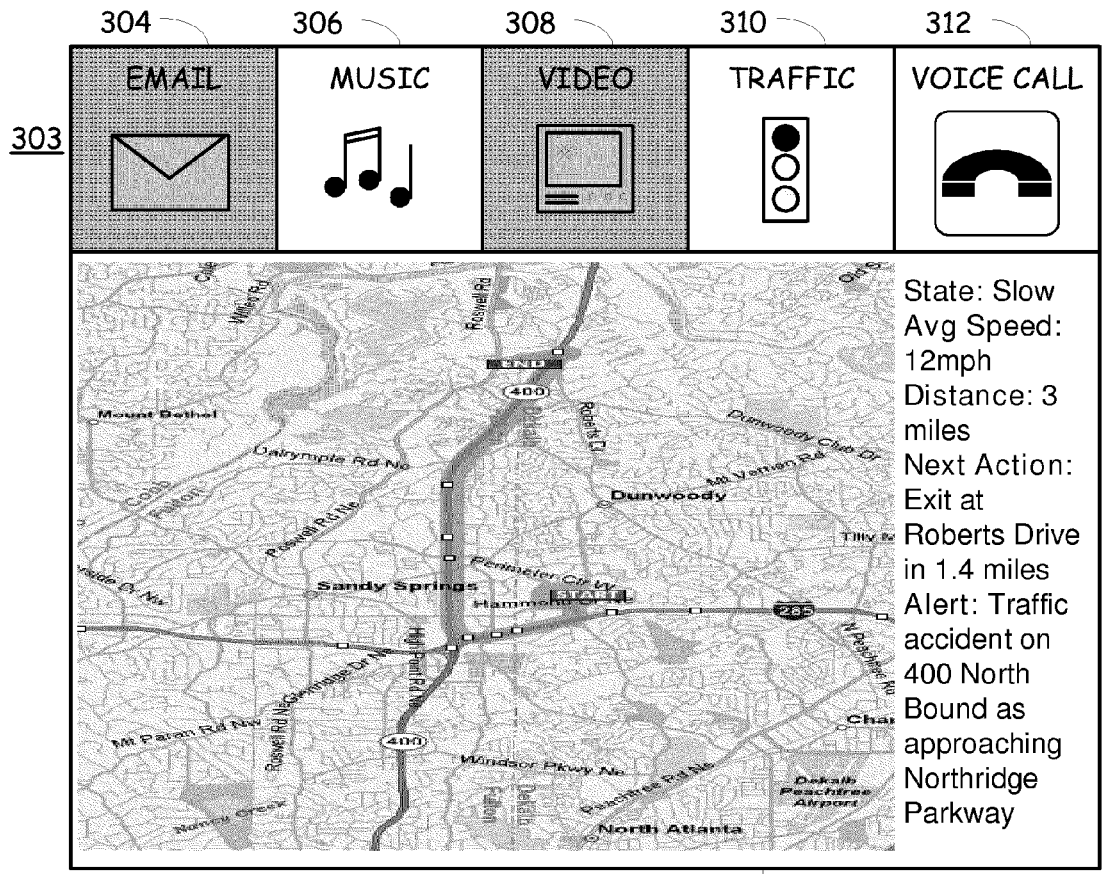
FIG. 3 is an exemplary layout for a display area in which the present invention has imposed a rule on the multi-media system and has resulted in deactivating, or making unavailable, certain functions of the multi-media system.

FIG. 3 is an exemplary layout for a display area in which the present invention has imposed a rule on the multi-media system and has resulted in deactivating, or making unavailable, certain functions of the multi-media system. In the illustrated state, the email function 304 and the video function 308 are shown as grayed-out to indicate that they are not available to the user. However, the music function 306, traffic 310 and voice call function 312 are readily available for a user to access.

In general, the present invention can be viewed as a multi-media system that has safety and operational controls and condition sensors built-in to the system or controlling the system externally. The condition sensors can include a variety of sensor types, such as: (a) devices that can directly measure parametric values of the vehicle operation (speed, application of brakes, pressure on accelerator, turning, engagement of blinkers, number of passengers, noise volume, etc) or can read such values from a vehicle data bus; (b) devices that can provide movement information through analysis of externally received data such as GPS or other location information systems; (c) user inputs; and (d) systems that provide control or informational status based on location information systems and other traffic analysis systems.

Figure 4:
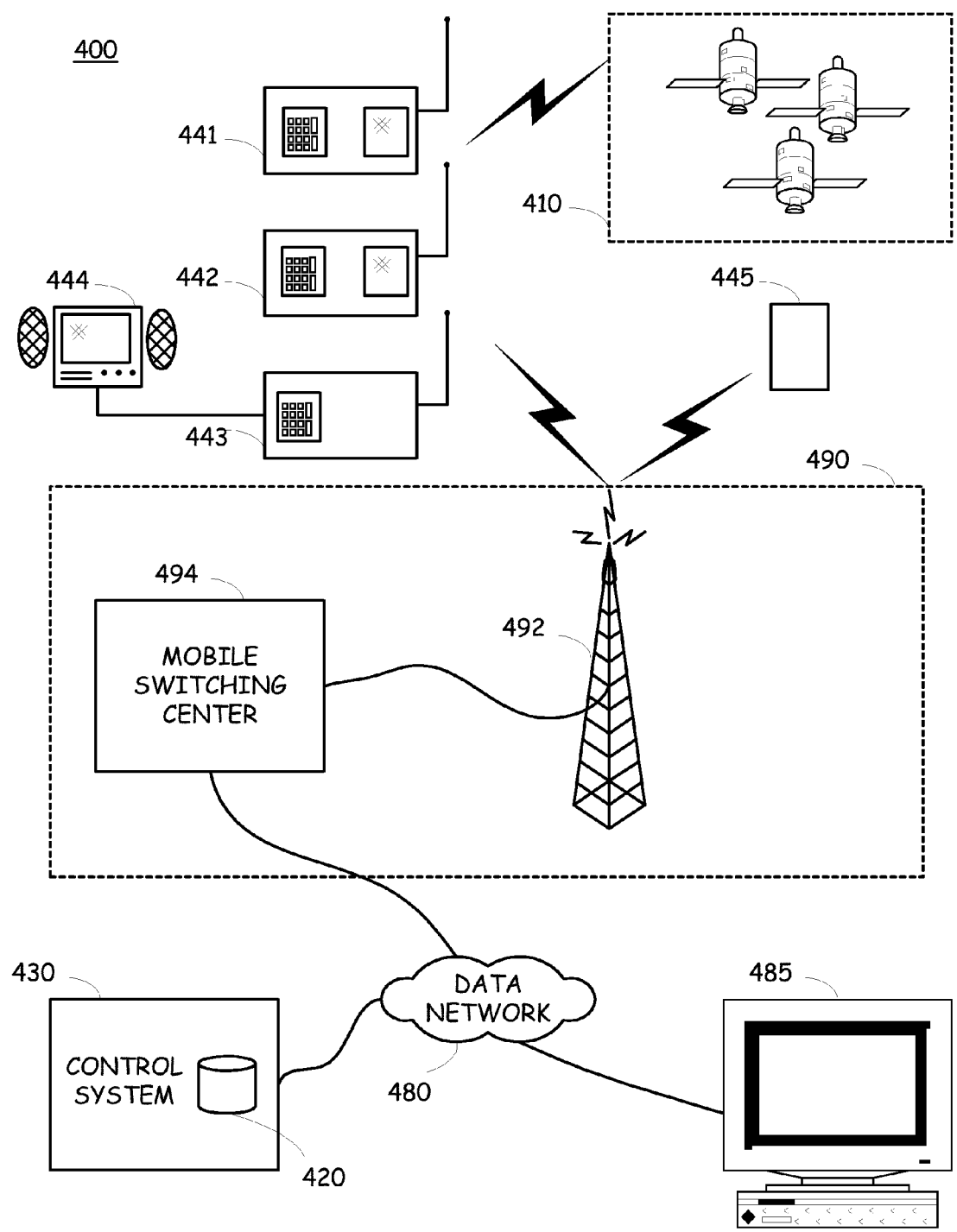
FIG. 4 is a system diagram of the various components and devices of an exemplary system/environment that could be utilized to provide some of the condition sensors for implementing embodiments of the present invention.

FIG. 4 is a system diagram of the various components and devices of an exemplary system/environment that could be utilized to provide some of the condition sensors for implementing embodiments of the present invention. The system 400 includes various components that are communicatively coupled to each other using various communication techniques. For the present invention, attention is drawn to the mobile devices 441, 442 and 443 and the multi-media system 444 that is attached to mobile device 443.

More generally, a geostationary orbiting satellite positioning system 410 operates to provide signals to mobile devices 441, 442 and 443. These satellite signals can be used by the mobile devices to identify the location of the mobile devices. The operation of such a typical geostationary orbiting satellite positioning system is well known to those skilled in the art. The most common satellite system that operates to provide such information is the Global Positioning System or GPS. The GPS is a constellation of twenty-four well-spaced satellites that orbit the Earth at 10,600 miles above sea level. The satellites are spaced at such intervals and altitude that for any given point on the Earth, at least four satellites will be communicatively seeable, or above the horizon. Each satellite in the GPS constellation includes a computer system, an atomic clock, and a transmitter. The satellites continuously transmit a data stream that identifies the current position of the satellite and the current time. Through the detection and decoding of these GPS signals, the mobile units are able to identify the longitudinal and latitudinal coordinates at which the mobile device is located. However, it should be appreciated that the present invention is not limited to operation with the GPS and other location technologies can also be utilized. Thus, when the term GPS is used within the context of this description, it is synonymous with other compatible location determining technologies unless otherwise stated.

The mobile devices 441, 442 and 443 are equipped to receive and/or determine location information, and also to transmit information to a dispatch and control or central system 430 through a communications medium. In the illustrated embodiment, the communications medium is a cellular telephone network utilizing technology such as GSM with GPRS, CDMA, TDMA, or similarly capable technologies. This technology enables the communication of data between the mobile devices and the control system. The cellular based data transmissions from the mobile devices 441, 442 and 443 are received by the mobile system 490 at antenna 492 and are provided to the mobile switching center 494. The mobile switching center then provides the received data transmissions to the control system 430 through a data network 480.

The control system 430 is also functional to transmit data to the mobile devices 441, 442 and 443 through the data network 480 and the cellular system 490. The control system 430 includes a database system 420 that houses, among other things, data utilized for various embodiments of the present invention. The mobile devices 441 and 442 are shown as including a display and a key pad. Such elements can be included in various embodiments of the present invention in addressing various aspects and functions of the invention and allow a user of the mobile device to review information received from the GPS transmitters and the control system, and to enter additional information to be provided back to the control system 430. However, it will be appreciated that other embodiments may not require such elements. The mobile device 443 is shown as interfacing to multi-media system 444. In this embodiment, the control system can provide data to the multi-media system 444 through the mobile device 443, or in other embodiments may directly provide data to the external device 444. Although not illustrated, it should be appreciated that the mobile devices may also interface to other data devices such as scanners, digital cameras, audio devices, analog to digital converters, an automobile data bus, measurement equipment, digital clocks, or other various devices.

The control system 430 includes a database system 420. The database system 420 can contain a variety of information depending on the various embodiments of the present invention. The database system 420 and the control system 430 may also be accessed via computer 485. Such a system allows the information in the database and information regarding the various mobile devices to be accessed from any computer system connected to the control system 430 through the data network 480. It should be appreciated that although FIG. 4 describes an exemplary sensor source that is suitable for the present invention, the present invention is equally applicable to operating with other sensor sources and is not limited to the illustrated environment. Rather, the illustrated environment has been provided as a non-limiting example of the operation of the present invention.

Figure 5:
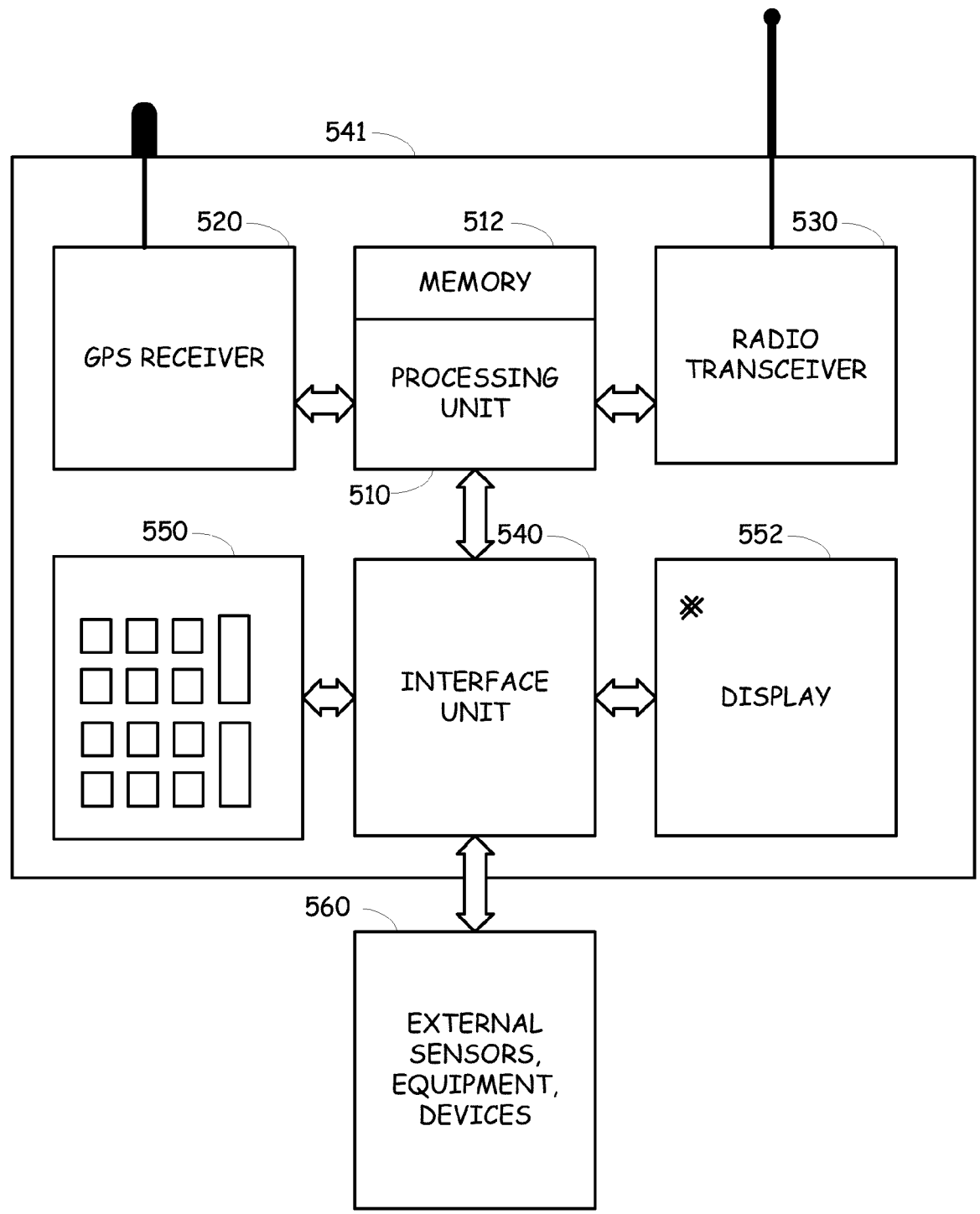
FIG. 5 is a block diagram of an exemplary mobile device that can operate as a traffic data probe and that is suitable for above-described sensor source.

FIG. 5 is a block diagram of an exemplary mobile device that can operate as a traffic data probe and that is suitable for above-described sensor source. The overall operation of the mobile device 541 is controlled by a processing unit 510 that includes memory element 512 for housing the software or firmware for defining the operation of the device, as well as temporary variables and status indicators. The mobile device 541 includes a GPS receiver 520 and a radio transceiver (transmitter and receiver) 530. Under control of the processing unit 510, the GPS receiver 520 can be enabled to detect signals from the GPS satellites and determine the location of the mobile device 541. The location information is then provided to the processing unit 510 for storage in memory 512 or for immediate transmission through radio transceiver 530. The processing unit 510 can interface to various input and/or output devices through an interface unit 540. For instance, the processor can receive key actuations from keypad 550 and display status or other information on display 552. The processing unit 510 can interface to external devices 560, measurement equipment, analog inputs, digital inputs or instrumentation through the interface unit 540 using a variety of wireless and wired technologies. For instance, a measurement device may provide an RF, digital or analog signal to the processing unit for storage, processing or otherwise acting upon. In addition, the processing unit 510 can interface to a vehicle bus through interface unit 540. As those skilled in the art will understand, the vehicle bus can convey a variety of status information regarding the vehicle, such as but not limited to, the vehicle speed, application of brakes, operation of the steering wheel, brake pressure, accelerator pressure, etc.

The processing unit 510 may also receive information through the radio transceiver 530 such as status, data and operational commands. As an example, the mobile device 541 may receive a request from the control system 530 to provide the current location of the mobile device 541. In response to receiving the request through the radio transceiver 530, the processing unit enables the GPS receiver 520 to decode the current location. This information is then transmitted to the control system 430 (see FIG. 4). Similarly, the processing unit 510 may periodically request the GPS receiver 520 to measure the current location of the mobile device 541. When the mobile device 541 enters into a particular area, this status information may be automatically transmitted by the processing unit 510 through the radio transceiver 520. Thus, depending on the various configurations, the location of the mobile device 541 can be continuously monitored, or it can simply report as it moves between or near areas of interest.

As has been described, this sensor source is an interaction of a control system with various mobile devices operating within a system. One aspect of this sensor source is the various mechanisms or triggers that invoke such interaction. In general, there are two types of systems or methods for devices to talk to each other. These general methods include: (a) polling or (b) interrupt driven. In a polled environment, a master or controller periodically or a' periodically communicates with another device, such as a slave device, to ensure the device is still active, to determine if the device needs any input or actions to be taken, or simply to provide information to or extract information from the device. In an interrupt driven system, devices autonomously communicate back to a master or central system either based on a schedule or the occurrence of an event. There are advantages and disadvantages to both techniques and the bottom-line deciding factor typically turns on the particular application or usage. In the present invention, a central system, the control system, is contacted by multiple mobile devices in an autonomous manner—interrupt driven. However, it should be understood that other sensor sources may utilize polled communication initiated by the control system.

Having described a suitable system and mobile device that could serve as one of the available sensor sources for embodiments of the present invention, it will be appreciated that one aspect of the present invention is a system that operates to gather data to identify a current operation condition and then control the operation of a multi-media system based on the identified operation condition. Each of the mobile devices 241 may operate to collect certain traffic related information and then to report this traffic related information to the central control system at a particular reporting rate.

The traffic related information can include a variety of information. Non-limiting examples of the traffic related information include the absolute location of the mobile device, the relative location of the mobile device, the speed of the mobile device, the average speed of the mobile device, and the characteristics of movement of the mobile device (i.e., consistent high-speed, consistent slow speed, vacillating speeds, stop and go, etc). The autonomous operation of the mobile device enables the mobile device to collect specific traffic related data and to transmit the collected data to the central control system at a specific rate either in a constant manner, or based on the analysis of the collected traffic data. The mobile devices 241 may also interface directly to, or directly control the multi-media system without ever interacting with the central control system. The data collected by the mobile device 241 may be immediately processed for identifying a current operating condition and applying that knowledge to control the operation of the multi-media system.

Thus, one embodiment of the present invention is an in-vehicle mounted multi-media system that incorporates various control and safety measures. An embodiment of the invention includes a multi-media user interface; one or more multi-media systems or components; a memory device; a sensor; and a processing unit. The processing unit includes an interface to the multi-media user interface, the multi-media systems, the memory device and the sensor. The processing unit operates to control the presentation of outputs from the multi-media system to the multi-media user interface based on readings from the sensor. The sensor is generally described as anything that can provide information relevant to the control or operation of the vehicle and or the environment in which it is operated. Three sensor categories have been described and are repeated here for clarity: (a) local sensors such as measuring devices connected to the vehicle for identifying vehicle operation parameters; (b) user selected criteria; and (c) traffic/condition/environmental information generated through a traffic analysis system such as the described multi-probe traffic analysis system, other systems or other data sources such as web accessible data stores. Each of these three sensor sources can operate alone or in combination in various embodiments of the present invention. The sensors can be used to detect and identify a variety of conditions. A few non-limiting examples of items detected by local sensors may include the speed of the vehicle, application of the brake pedal, on/off state of the lights, on/off state of the windshield wipers, position of the steering wheel, etc. A few non-limiting examples of user selected criteria include assignment of priorities to various functions and/or features, configuration of the system (front display, rear display), typical use of the vehicle (recreation/business/travel), time/date constraints for limiting the operation of certain functions, driver ID mode selections in which each particular driver ID has a particular profile defining the operation of the multi-media system, etc. A few non-limiting examples of the traffic/condition information from a traffic analysis system includes current traffic conditions, weather conditions, traveling speed, category of operation (stop and go traffic, standing still, high-speed travel), etc.

The sensor information is used to identify conditions. The conditions can then be used to identify a defined mode of operation for the multi-media system. For instance, depending on the various conditions, the content available on a display of the multi-media system can be restricted. As an example, if the vehicle conditions indicate that the vehicle is moving but is not in a high-traffic area, the driver may be able to operate the multi-media system to place a voice call (i.e., look up and address and initiate a call). However, if the condition of the vehicle is stopped, such as in a parking lot, the driver may be able to access email, down load music and video, and place voice calls.

Thus, it will be appreciated that a database of rules defining operational allowances and restrictions can be indexed by the various conditions or can be created through the application of a heuristically oriented algorithm that derives the operational allowances. In addition, the rules can be hard-coded into the system, defined by a user, selected by a user from a pre-defined set of rules, or a combination of any of the above. The following examples illustrate some potential rules that could be incorporated into various embodiments of the invention:

(a) rules dependent upon the location of the display device (i.e., passenger seat, driver seat and rear seats);

(b) rules dependent upon the swivel position of a front seat display (i.e., swiveled toward the driver or the passenger);

(c) rules dependent upon a traffic update becoming available while downloading music or other content (i.e., stop the music download and allow the traffic update to override);

(d) rules dependent upon the vehicles entering into an area with bad reception (i.e., high bandwidth demand may cause an action or feature to be suspended);

(e) rules dependent upon the type of content or action being requested (i.e., for a request from a front seat unit, the delivery of that content overrides a request from a back seat unit);

(f) rules dependent upon the priority of message or content types (i.e., reception of an email message may override a video stream);

(g) rules dependent upon traffic conditions (i.e., if the vehicle is approaching a congested area while music is active on the multi-media system, the music delivery is overridden to provide a traffic update to the driver);

(h) rules based on the characterization of the download connection (i.e., if you are in a WiFi zone and downloading content and you leave the WiFi zone and enter a CDMA zone, suspend the download, earmark the last packet received, and then resume the download from the CDMA system); and (i) rules dependent upon priorities assigned to actions (i.e., if you are downloading any content, you can suspend the download, activate another function, and then resume the download).

Figure 6:
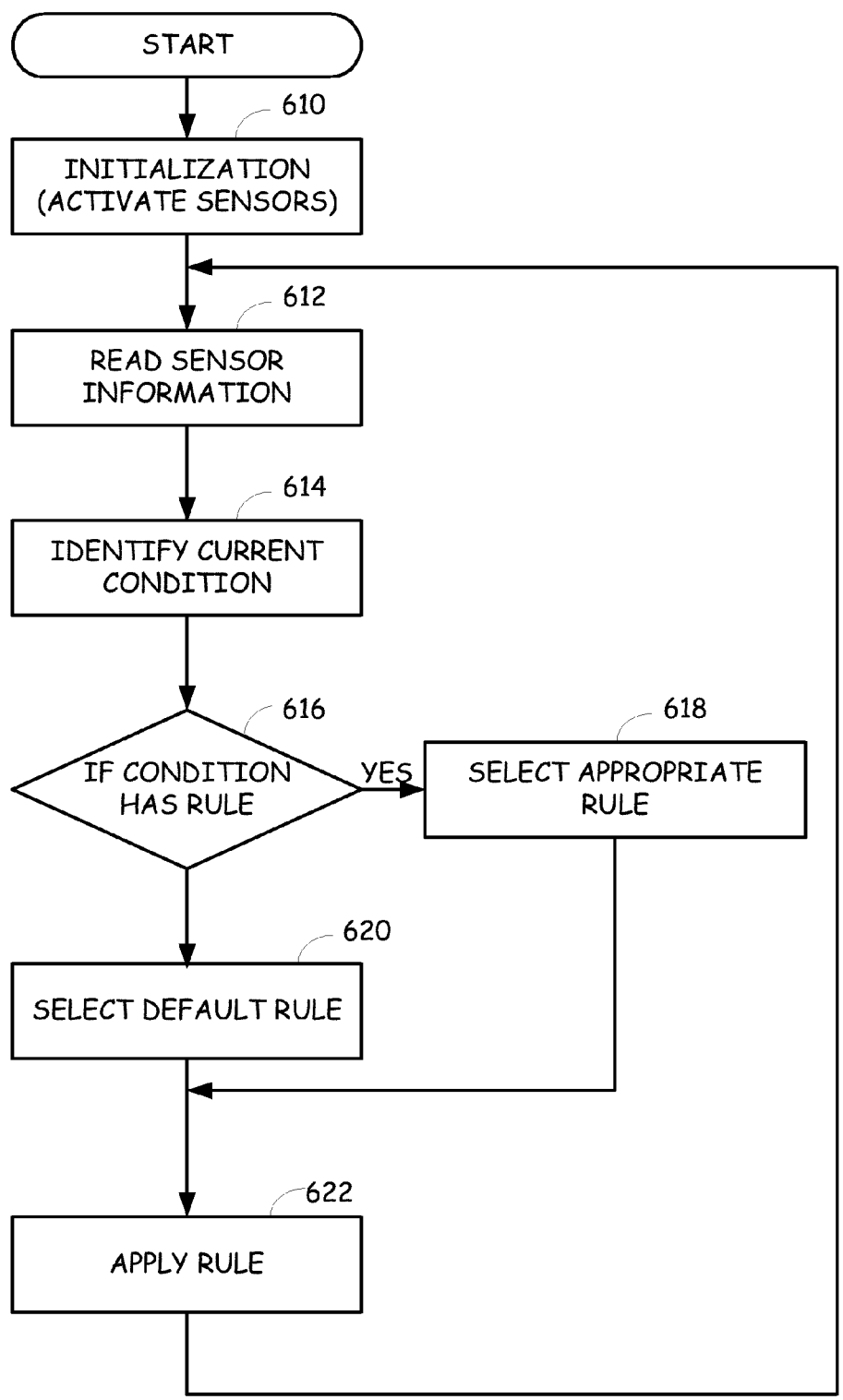
FIG. 6 is a flow diagram illustrating the steps involved in one embodiment of the present invention.

FIG. 6 is a flow diagram illustrating the steps involved in one embodiment of the present invention. The system is initialized 610 by clearing out buffers and registers as well as setting default values and turning on the sensor(s). The sensor(s) then begin to collect various measurement data which can be read and analyzed by a processing unit 612. As measurement data is collected, it is analyzed and may result in the identification of a condition 614. For instance, repeated application of the brake pedal while the vehicle speed is below a certain speed threshold and above a stop threshold may give rise to the identity of a high-traffic condition. Likewise, if the windshield wipers are active and the brake pedal is obtaining a threshold amount of activity, the condition may be heavy rain. In addition, if a certain number of passengers are detected, the system may conclude that the carpool condition applies. The condition may be any of a variety of hard-coded conditions, user defined conditions or a combination of both. Those skilled in the art will appreciate that a variety of such conditions may be identified and incorporated into the present invention. In addition, the conditions may be mutually exclusive in one embodiment yet have some overlap in other embodiments.

Once a condition is identified, the process searches for a presentation or operational rule that corresponds to the identified condition 616. If the condition has a corresponding presentation rule, then that rule is selected 618. Otherwise, a default rule is selected 620. The selected rule is then applied in the operation of the system or the presentation of the various media contents 622.

In another embodiment, all or a portion of the sensor aspect of the invention may be implemented using a multi-probed traffic analysis system. In such an embodiment, the vehicle in which the multi-media system resides may also include a traffic probe. During operation, the traffic probe gathers and reports data to be analyzed by a central control system. In addition, the traffic probe or some other device within the vehicle receives traffic related data from the central control system. The traffic related data may be raw data that needs to be further parsed and analyzed by the in-vehicle system, it may be a straight control signal to force an action, or it may be somewhere in between these two extremes. In either case, the received information is used to identify a condition and/or presentation rule. The identified presentation rule is then used to govern the operation of the multi-media system until a rule change is invoked.

A rule change can be invoked in one of several manners. For instance, a rule change may be invoked automatically upon the detection of a new condition or a condition change. For instance, if a vehicle emerges from a traffic jam and resumes normal speed, this is a change in condition that may invoke the application of a new rule. A rule change may be invoked in response to receiving a command from a sensor or other system or by user selection. In the latter case, the user may override the currently active presentation rule and invoke a particular operation. In one embodiment of the present invention, any such exception invoked by a user can be logged or recorded and can be made available or published to a third party, such as an insurance agency or a police department investigating an accident. The presentation rule override can be limited to a period of time or it may be a permanent override. In addition, an embodiment of the present invention can utilize a tiered override feature such that the ability to override is limited or restricted based on the condition information. For instance, in one condition, one set of overrides are available and in another condition, another set of overrides are available. Similarly, an override request for a rear seat display can be treated significantly different than one for a front seat display and especially, a front seat display that has been swiveled to point to the driver.

FIG. 7 is a matrix that could be used to correlate current conditions with operating rules in an exemplary embodiment of the present invention. It should be appreciated that the illustrated matrix is provided as a non-limiting example, although various aspects and features that are illustrated, may in and of themselves be considered novel. The matrix includes column headers that correspond with conditions A-O and the row headers correspond to various features or operations of a multi-media system. The matrix includes and X for each intersection of condition and feature at which the feature is disabled and is blank for enabled or available features. Thus, it is apparent that when Condition A is present 702, all of the features or capabilities of the multi-media system are inactive. However, when Condition O is present 710, all of the features of the multi-media system are available. As an example, Condition A may be present while a vehicle is in heavy traffic, there is inclement weather, the driver is behind schedule and there are several passengers in the vehicle. On the other hand, Condition O may be present while the vehicle is idling in a grocery store parking lot. When Condition E is present, only email is disabled.

Looking at the other side of the matrix, one can determine the conditions under which a particular feature is available or disabled. For instance, the front video operation 706 is disabled when Conditions A-D are present and is enabled otherwise. Similarly, email operation is not available when Conditions A, C or E are present. It should be appreciated that one or more conditions may be present at the same time or, the conditions can be set up to be mutually exclusive. In the first instance, the matrix may be used to identify all disabled features and basically merge the disabled features for each active condition. In the later instance, the condition directly corresponds with the available operations.

Although for illustrative purposes, the present invention is described within particular embodiments or applications, it should be appreciated that the present invention is not limited by these examples or applications. Rather, the present invention and aspects of the present invention can be incorporated into a variety of embodiments and applications without departing from the spirit and scope of the present invention.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or aspects or possible combinations of the features or aspects. Variations of embodiments of the present invention that are described and embodiments of the present invention comprising different combinations of features noted in the described embodiments will occur to persons of skilled in the art. The present invention may be implemented by any one of, or any combination of, software, hardware, and/or firmware. In the description and claims, each of the verbs, "comprise" "include" and "have", and conjugates thereof, are used to indicate that the object or objects of the verb are not necessarily a complete listing of members, components, elements or parts of the subject or subjects of the verb.

What is claimed is:

1. An in-vehicle multi-media control system that, based on collected data, controls the multi-media system in a manner to help improve safety of operation, the system comprising:
    a multi-media user interface including a graphical display device;
    at least one multi-media system operating independent of the control system;
    a memory device;
    a sensor;
    a central control system;
    a plurality of traffic probes communicatively coupled to the central control system;
    a control process operating within the central control system and being operable to receive traffic related data from the plurality of probes and provide control data to a single processing unit; and the single processing unit including an interface to the multi-media user interface, the at least one multi-media system, the memory device, the sensor, and being communicatively coupled to the central control system, and executing instructions in the memory device, the processing unit is operable to control the presentation of outputs from the independently operating multi-media system to the multi-media user interface based at least in part on readings from the sensor and on the control data received from the central control system, independently of input from the multi-media user.

2. The in-vehicle multi-media control system of claim 1, wherein the sensor includes a GPS receiver and the processing unit is operable to control the presentation of outputs from the multi-media system based at least in part on location readings from the GPS receiver.

3. The in-vehicle multi-media control system of claim 1, wherein the memory device includes a plurality of rules correlating conditions and allowable operations, and the processing unit is operable to control the presentation of outputs from the multi-media system based at least in part on the rules in view of the readings from the sensor, such reading identifying a condition.

4. The in-vehicle multi-media control system of claim 1, wherein the multi-media user interface includes audio speakers.

5. The in-vehicle multi-media control system of claim 4, wherein the graphical display includes a swivel mount and the sensor includes the ability to identify when the graphical display is swiveled on a horizontal plane so that the driver can view the graphical display.

6. The in-vehicle multi-media control system of claim 5, wherein the processing unit is operable to control the presentation of outputs from the multi-media system based at least in part on the swivel position of the graphical display.

7. The in-vehicle multi-media control system of claim 1, wherein the control process is operable to identify various traffic conditions and the control data is based at least in part on the traffic conditions.

8. The in-vehicle multi-media control system of claim 7, wherein if the control data indicates that the vehicle is in a high-traffic area, the processing unit is operable to enable a first set of capabilities of the multi-media system and if the vehicle is in a low-traffic area, to enable a second set of capabilities.

9. The in-vehicle multi-media control system of claim 8, further comprising a user input interface, and the processing unit is operable to receive an override indication from the user input interface and in response to the override indication, enable a third set of capabilities.

10. The in-vehicle multi-media control system of claim 1, wherein the memory device includes a plurality of rules identifying conditions and allowable operations, and the processing unit is operable to control the presentation of outputs from the multi-media system based at least in part on the rules in view of the control data, and further comprising a user interface that enables a user to define and/or select the plurality of rules.

11. The in-vehicle multi-media control system of claim 3, wherein the rules identify priorities for a plurality of multi-media events and if a new higher priority multi-media event occurs during the provision of a multi-media event at a lower priority, the new multi-media event will override the lower priority multi-media event.

12. A method for controlling the operation of an independently operated in-vehicle multi-media system, the method comprising the steps of:

receiving condition information;

identifying a presentation rule from a plurality of presentation rules based at least in part on the condition information; and controlling the presentation of the outputs of one or more multi-media devices based upon the identified presentation rule by selectively enabling or disabling the output of the independently operated multi-media system to an output device, independently of input from the multi-media user.

13. The method of claim 12, wherein the step of receiving condition information further comprises the step of receiving location information from a GPS receiver.

14. The method of claim 12, wherein the step of receiving condition information further comprises the step of receiving control information from a central traffic monitoring system.

15. The method of claim 12, wherein the step of receiving condition information further comprises the step of receiving operational information regarding the vehicle.

16. The method of claim 12, wherein the outputs of the one or more independently operated multi-media devices is provided to a display and the step of receiving condition information further comprises the step of receiving information regarding the viewing position of the display.

17. The method of claim 12, wherein the identified presentation rule establishes a priority ranking for the one or more multi-media devices and the step of controlling the presentation of the outputs of the one or more independently operated multi-media devices comprises giving precedence to the presentation of the output of a multi-media device that has a higher priority than a currently presented multi-media output.

18. A method for controlling the operation of an independently operated in-vehicle multi-media system, the method comprising the steps of:

receiving traffic related data from a central control system;

receiving location information from a GPS receiver;

providing the location information to the central control system;

identifying a presentation rule from a plurality of presentation rules based at least in part on the traffic related data and the location information; and controlling the presentation of the outputs of one or more independently operated multi-media devices based upon the identified presentation rule so that one set of multi-media capabilities are available when the traffic related data and location information satisfy a first condition and a second set of multi-media capabilities are available when the traffic related data and location information satisfy a second condition, independently of input from the multi-media user.

19. The method of claim 18, further comprising the step of receiving a plurality of user selected presentation rules.

* * * * *